United States Patent [19]

Kawai et al.

[11] 4,134,596

[45] Jan. 16, 1979

[54] OIL SEAL APPARATUS

[75] Inventors: Yukio Kawai, Toyota; Masaharu Adachi, Chiryu, both of Japan

[73] Assignees: Toyota Jidosha Kogyo Kabushiki Kaisha, Toyota; Koyo Seiko Kabushiki Kaisha, Osaka, both of Japan

[21] Appl. No.: 784,537

[22] Filed: Apr. 4, 1977

[30] Foreign Application Priority Data

Oct. 9, 1976 [JP] Japan .................. 51-121411

[51] Int. Cl.$^2$ .................. F16J 15/32; F01P 5/10
[52] U.S. Cl. .................. 277/152; 277/165; 277/DIG. 4; 277/214; 123/41.47
[58] Field of Search .................. 123/41.47; 305/11, 12; 277/152, 153, 58, 59, DIG. 4, 95, 164, 165, 201, 202, 208, 214

[56] References Cited

U.S. PATENT DOCUMENTS

| | | | |
|---|---|---|---|
| 2,516,191 | 7/1950 | Englesson | 277/152 X |
| 2,868,574 | 1/1959 | Rich | 277/164 |
| 2,992,027 | 7/1961 | Wright et al. | 277/58 |
| 3,099,454 | 7/1963 | Walinski | 277/152 X |
| 3,455,564 | 7/1969 | Dega | 277/153 X |
| 3,510,138 | 5/1970 | Bowen et al. | 277/153 X |
| 3,531,168 | 9/1970 | Bainard | 277/153 X |
| 3,713,659 | 1/1973 | Derman et al. | 277/95 |
| 3,917,286 | 11/1975 | Loyd | 277/153 X |

FOREIGN PATENT DOCUMENTS 47-15083 5/1972 Japan .................. 277/152

*Primary Examiner*—Robert S. Ward, Jr.
*Attorney, Agent, or Firm*—Blanchard, Flynn, Thiel, Boutell & Tanis

[57] ABSTRACT

An oil seal apparatus, particularly for use with a vehicle engine, wherein an oil seal coacts between a stationary casing and a rotatable shaft which projects through the casing. The oil seal apparatus includes an annular elastomeric seal member having a pair of axially spaced annular lip portions disposed for engagement with the shaft. One lip portion is positioned innermost for creating an oil seal, and the other lip portion is positioned outermost for creating a dust seal. This other lip portion is provided with a auxiliary annular lip which projects axially outwardly along the shaft. The auxiliary lip has an annular groove around its periphery to facilitate transfer of water around the seal member and prevent the water from flowing axially inwardly along the shaft past the dust seal.

11 Claims, 5 Drawing Figures

OIL SEAL APPARATUS

FIELD OF THE INVENTION

This invention relates to an oil seal apparatus for preventing entry of muddy water and the like. More particularly, it relates to an oil seal apparatus suited for use in the front portion of an internal combustion engine.

BACKGROUND OF THE INVENTION

In oil seal apparatuses used for casings containing equipment, lips are provided to prevent the entry of dust, rainwater and muddy water which might otherwise contact the equipment.

Especially in the front portion of the cylinder block of an internal combustion engine, the crankshaft projects and the crankshaft pulley is fixed to the projection. Therefore, an oil seal fitted between the cylinder block and the crankshaft is more liable to be exposed to dust, rainwater and muddy water. The conventional oil seal comprises a main lip for oil sealing and a dust lip to prevent the entry of dust etc. However, this known seal has not been able to prevent the entry of rainwater or muddy water which runs down along the cylinder block or crankshaft pulley.

Accordingly, an object of this invention is to provide an oil seal apparatus effective for preventing the muddy water etc. which runs down along the equipment casing from entering into the oil sealed portion of the casing.

Another object of this invention is to provide an oil seal apparatus effective for preventing the muddy water etc. which runs down along a rotating member, such as the crankshaft pulley fixed to the shaft outside the casing, from entering into the casing.

A further object of this invention is to provide an oil seal apparatus especially suited for use in the front portion of the cylinder block of an internal combustion engine.

DETAILED DESCRIPTION

Figure 1:
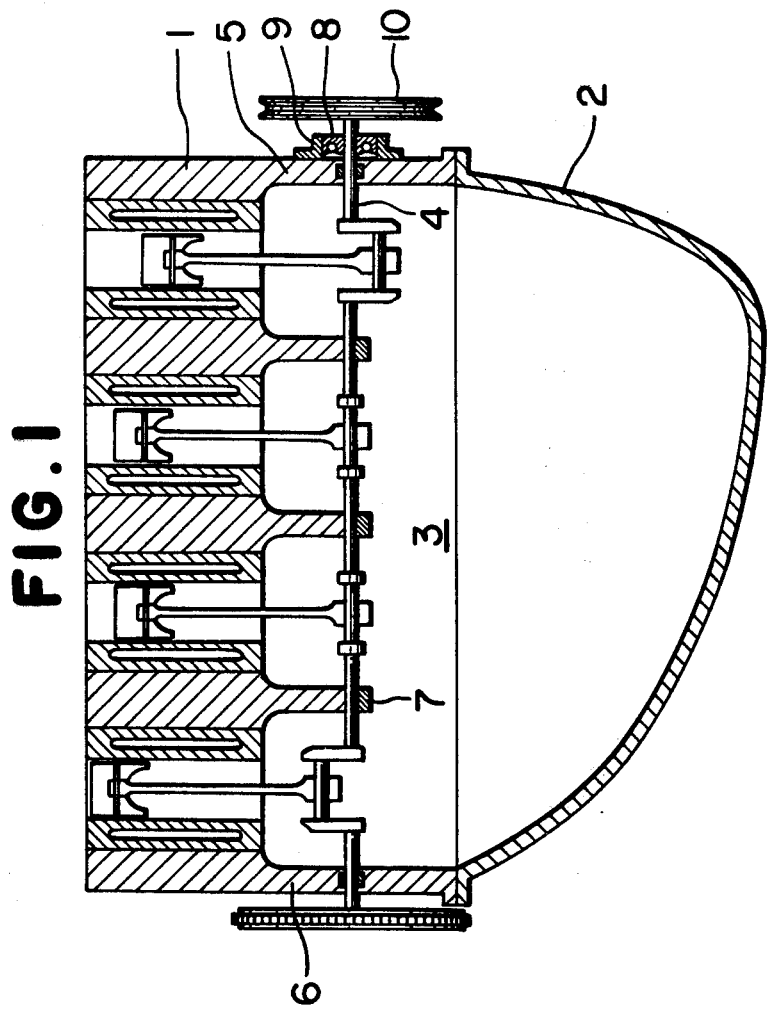
FIG. 1 is a schematic cross-sectional view of an internal combustion engine to which this invention is applied.

In FIG. 1, a crankshaft 4 rotates in a crankcase 3 defined by the cylinder block 1 and oil pan 2 of an internal combustion engine. The crankshaft 4 is rotatably supported by end walls 5 and 6 of the cylinder block and intermediate bearing caps 7.

An oil seal 8 is fitted to the front end wall 5 of the cylinder block 1 to prevent the leakage of oil from the crankcase 3. The oil seal 8 is usually provided in an oil seal housing 9 which is mounted on the front end of the crankcase. The projecting front end of the crankshaft 4 is fitted with a pulley 10 to drive a fan, water pump or generator (not shown) by means of a belt, as is conventional.

Figure 2:
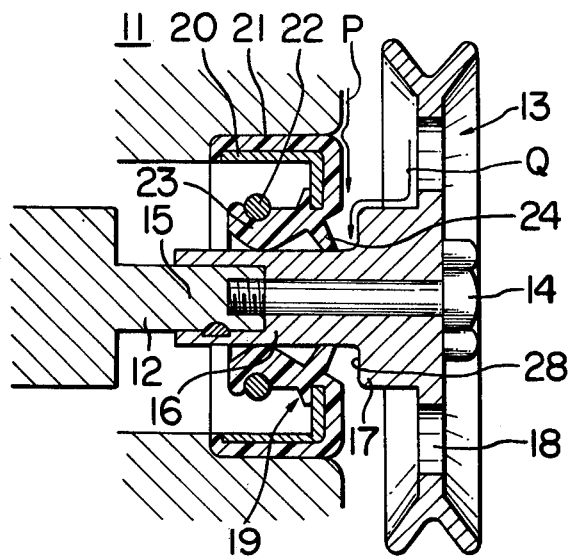
FIG. 2 is a cross-sectional view showing a conventional oil seal apparatus.

Referring to FIG. 2, a conventional oil seal apparatus will now be described.

At the projecting front end of a crankshaft 12, which passes through an oil seal housing 11, there is fixed a crankshaft pulley 13 by means of a bolt 14. The pulley 13 consists of a tubular shaft portion 16 into which an end 15 of the crankshaft 12 is inserted and a boss portion 17 and a disc portion 18, both rising radially from said shaft portion 16. An oil seal 19 coacts between the housing 11 and the pulley 13, and includes a cup-shaped mounting portion 21 which is fixed to the housing 11 and confines a core plate 20, a main lip portion 23 which is kept snugly in contact with the shaft portion 16 by a spring 22, and a dust lip portion 24 which is positioned closer to the crankshaft pulley 13 than said main lip portion 23 and is kept in snug contact with the shaft portion 16. Here, the dust lip portion 24 is formed as an annular sheet or rib which extends primarily radially with respect to the shaft portion 16. The rib portion 24 has the inner annular edge thereof disposed in snug sliding contact with the rotatable shaft to create a seal therewith.

As illustrated in FIG. 2, the oil seal 19, which includes the mounting portion 21 and the lip portions 23 and 24, is formed integrally as a one-piece member and is preferably constructed from an elastomeric material, such as rubber. This one-piece seal 19 is suitably reinforced, however, by the core plate 20 which is also cup-shaped and disposed within the cup-shaped mounting portion 21.

The above-described conventional oil seal apparatus has the following shortcoming. When the entire unit is splashed with muddy water, the water flows along the housing 11 and mounting portion 21 onto the dust lip portion 24, as indicated by the arrow P. The water also flows through the crankshaft pulley 13 onto the dust lip portion 24, as indicated by the arrow Q. Therefore, the conventional oil seal apparatus involves the risk of muddy water flowing into the equipment past the dust lip portion 24. This entry of muddy water increases impurities in the crankcase oil and accelerates abrasion in various parts of the equipment. In addition, it gives rise to abnormal wear in the main lip portion 23 of the oil seal and the shaft portion 16 with which said main lip portion 23 is kept in snug contact.

To prevent the entry of muddy water, the dust lip portion 24 has been strongly pressed against the shaft portion 16. This method, however, generates much heat at the contact area, whereby the oil seal made of rubber becomes less durable through deterioration. Also, it may accelerate the wear of the shaft by the dust lip itself.

This invention has overcome such shortcoming of the conventional oil seal apparatus. An oil seal apparatus embodying this invention will now be described with reference to FIG. 3.

Because the oil seal apparatus according to this invention differs from the conventional one (as shown in FIG. 2) only in the construction of the dust lip portion, a description of the other details has been omitted.

Figure 3:
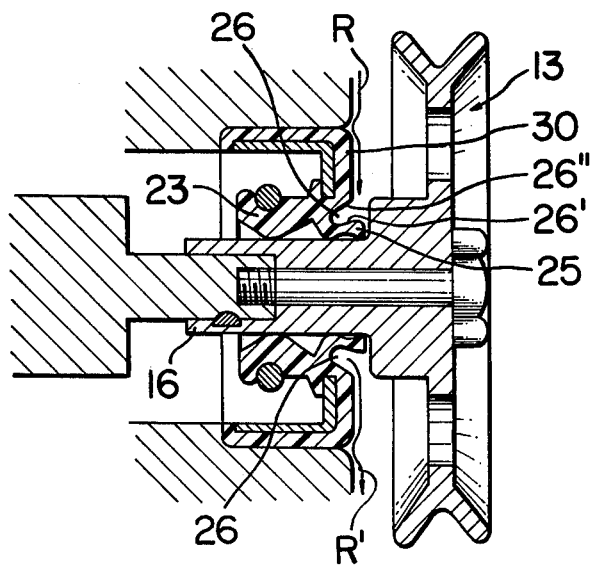
FIG. 3 is a cross-sectional view of an oil seal apparatus embodying this invention.

As shown in FIG. 3, the dust lip portion according to this invention is provided with an axially extending auxiliary lip or flange 25, which lip 25 is provided at a position closer to the crankshaft pulley 13, as compared with the main lip portion 23. The auxiliary lip 25, which is integral with and projects axially from the radially innermost portion of the dust lip portion 24, projects axially outwardly beyond the outer end face 30 of the oil seal and is formed with an annular water-collecting groove 26 along its periphery. This groove 26, which thus surrounds the lip 25, is preferably formed with its inner annular surface 26' disposed so that it sloped radially inwardly toward the crankshaft as the groove projects axially inwardly from the free end of the lip. Because of this, that portion of the groove 26 which is disposed above the crankshaft thus has the inner end thereof disposed below the mouth of the groove, whereby the water flowing downwardly along the front face of the crankcase will accordingly readily flow into the groove. The outer annular surface 26" of the groove is also preferably sloped similar to the surface 26'.

In the oil seal apparatus according to FIG. 3, descending muddy water is caught by the groove 26 as indicated by arrow R. The water then flows along the groove 26 down to below the shaft portion 16, and is discharged as indicated by the arrow R'. This eliminates the risk of entry of water into the engine crankcase, such as is experienced with the conventional oil seal apparatus of FIG. 2.

Figure 4:
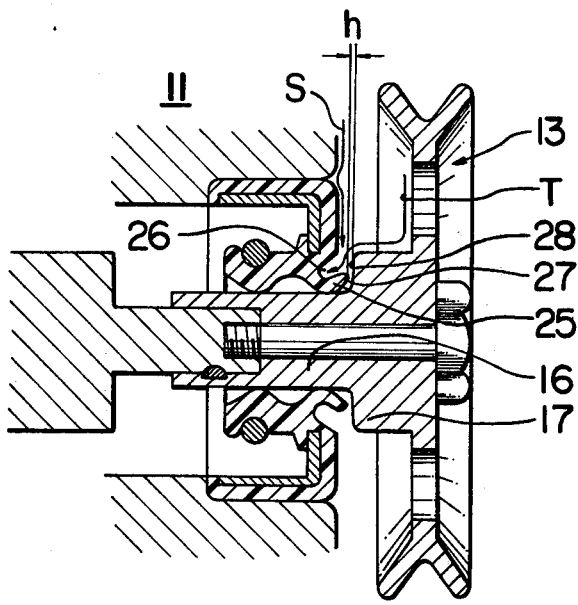
FIG. 4 is a cross-sectional view of another oil seal apparatus embodying this invention.

Another embodiment of the invention, as shown in FIG. 4, is designed so as to catch the muddy water which descends along the crankshaft pulley 13. The structure of this embodiment is identical to FIG. 3 except that the auxiliary lip 25 has an axial end flange 27 which flares radially outwardly and is placed either in contact with, or with a little space (h) from, the end face 28 of the boss portion 17. It is desirable that the space (h) is as little as possible.

In the above-described oil seal apparatus according to FIG. 4, muddy water descending along the housing 11 is caught by the groove 26, as indicated by the arrow S. The water flowing down along the crankshaft pulley 13 is also caught by the groove 26, as indicated by the arrow T.

In this embodiment, muddy water can not enter past the main lip portion 23 because the end 27 of the auxiliary lip 25 is positioned in contact with, or with the small space (h) from, the face 28 of the boss portion 17.

Figure 5:
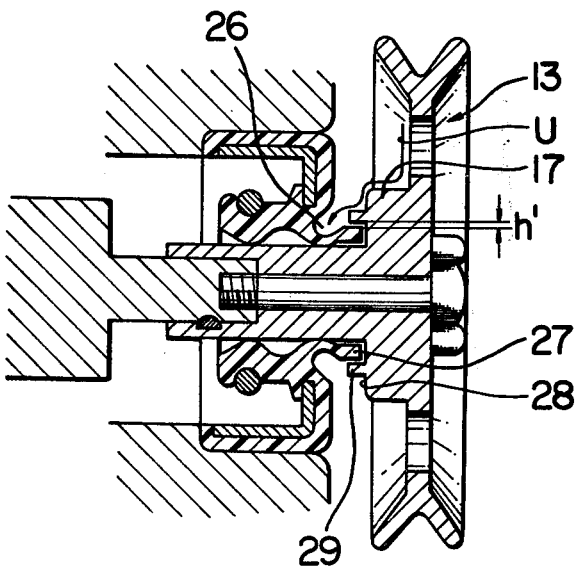
FIG. 5 is a cross-sectional view of still another oil seal apparatus embodying this invention.

Next, a further embodiment as shown in FIG. 5 will be described. This embodiment is designed so as to positively guide muddy water descending along the crankshaft pulley 13 into the groove 26. To attain this end, an annular riblike projection 29 is formed on the boss portion 17 of the pulley 13. The projection 29 extends axially from the end face 28 of the boss portion 17, and enclosingly surrounds the end 27 of the auxiliary lip 25. It is desirable that the radial clearance space (h') between the outside of the end 27 of the auxiliary lip 25 and the inside of the projection 29 be as small as possible. They may be in contact, if necessary.

In the above-described embodiment, muddy water descending along the crankshaft pulley 13 is positively guided to the groove 26 along the periphery of the annular projection 29, as indicated by arrow U, thus preventing the entry of muddy water into the main lip portion 23.

The above description is made with respect to an oil seal apparatus for use in the front portion of an internal combustion engine. However, this invention is not limited to the above-described embodiments, since it is applicable to all equipment which are subject to be splashed with muddy water and the like.

The construction of the rotating member, such as the crankshaft pulley, is not limited to the above embodiments. Various design modifications are possible without departing from the technical scope of this invention.

As will be understood from the above, this invention prevents the entry of muddy water through the oil seal, thereby preventing an increase in impurities in the oil and increasing the durability of the oil seal itself.

Although a particular preferred embodiment of the invention has been disclosed in detail for illustrative purposes, it will be recognized that variations or modifications of the disclosed apparatus, including the rearrangement of parts, lie within the scope of the present invention.

The embodiments of the invention in which an exclusive property or privilege is claimed are defined as follows:

1. In an oil seal apparatus including a stationary casing, a shaft rotatable in said casing, and an oil seal ring for preventing passage of oil from between the shaft and the casing, the oil seal ring being fixed to said casing at one end and maintained in snug sealing contact with said shaft at the other end, said oil seal ring having a mounting portion fixed to the casing and a main lip portion snugly contacting said shaft at a first axial location, comprising the improvement wherein said oil seal ring has an auxiliary lip portion which snugly contacts the shaft at a second axial location farther outside of the casing than said first axial location, and said auxiliary lip portion defining at the free edge thereof an elongated annular flange surrounding and extending axially of the shaft in a direction away from said first axial location, said annular flange being preformed to define an annular groove around its periphery.

2. An oil seal apparatus according to claim 1, wherein a rotating member is fixed to the shaft outside the casing and has a wall portion extending radially outwardly from said shaft, the wall portion being kept in contact with or slightly spaced from the free axial end of the auxiliary lip portion, the rotating member being axially spaced from the casing and defining therebetween an annular space in surrounding relationship to said shaft and said auxiliary lip portion, said annular space being free of other seals, and said annular groove being axially elongated and having an axially inner end which is closed and an axially outer end in open communication with said space, the closed inner end of said groove being radially closer to said shaft than said open outer end.

3. An oil seal apparatus according to claim 1, wherein a rotating member is fixed to the shaft outside the casing and has a wall portion extending radially outwardly from said shaft, the wall portion having an annular projection which axially covers and surrounds at least part of said auxiliary lip portion.

4. An oil seal apparatus according to claim 1, wherein the casing is an oil seal housing fixed to the cylinder block of an internal combustion engine, the rotating shaft is a shaft rotating coaxially with the crankshaft, and the oil seal ring is provided in the front portion of the engine.

5. An oil seal apparatus according to claim 2, wherein the casing is an oil seal housing fixed to the cylinder block of an internal combustion engine, the rotating shaft is a shaft rotating coaxially with the crankshaft, the oil seal ring is provided in the front portion of the engine, the rotating member is a crankshaft pulley, and the wall portion is a boss portion of said crankshaft pulley.

6. In a vehicular internal combustion engine having a crankcase, a crankshaft rotatably supported on the crankcase and projecting outwardly through the front wall thereof, and an oil seal means fixedly mounted with respect to the crankcase and disposed in surrounding and sealed relationship with respect to the crankshaft, said oil seal means including an elastomeric ring-like seal member having primary and secondary annular lip portions which are axially spaced apart and which project radially inwardly into sealing engagement with the crankshaft, said secondary lip portion being positioned outermost with respect to the crankcase, comprising the improvement wherein said secondary lip portion is provided adjacent the radially inner end thereof with an elongated annular flange portion which surrounds the crankshaft and projects axially of the crankshaft in a direction away from the primary lip portion, the flange portion being preformed to define an annular groove which surrounds the exterior periphery of the flange portion and opens axially outwardly so as to communicate with an exterior end face of the seal member so as to collect therein the water which runs downwardly over the upper part of said exterior face, the exterior periphery of the flange portion projecting axially inwardly from the free end of the flange portion and sloping radially inwardly toward the crankshaft so that the closed inner end of the groove is radially disposed more closely adjacent the crankshaft than the open mouth of the groove.

7. In an engine according to claim 6, wherein the flange portion projects axially outwardly a sufficient extent so that the free edge of the flange portion is spaced axially outwardly beyond the exterior end face of the seal member.

8. In an engine according to claim 6, including a rotatable member nonrotatably secured to said crankshaft adjacent the forward end thereof, said rotatable member being positioned outwardly from said oil seal member and the free axial end of said annular flange portion being positioned in contact with or slightly spaced from a radially outwardly extending wall of said rotatable member.

9. In an engine according to claim 8, wherein the radial wall of said rotatable member includes an annular portion which projects axially outwardly therefrom and surrounds and axially overlaps at least a part of said annular flange portion.

10. In an engine according to claim 8, wherein the rotatable member is axially spaced from the crankcase and defines therebetween an annular space in surrounding relationship to said crankshaft and said secondary lip portion, said annular space being free of other seals.

11. In a vehicular internal combustion engine having a crankcase, a crankshaft rotatably supported on the crankcase and projecting outwardly through the front wall thereof, a disclike rotatable member nonrotatably secured to the crankshaft adjacent the forward end thereof, said rotatable member being spaced forwardly from the front wall of said crankcase, and an elastomeric oil seal ring fixedly mounted with respect to the crankcase adjacent the front wall thereof and disposed in surrounding and sealed relationship with respect to the crankshaft, said oil seal ring including a radially outer mounting portion which is fixedly connected to said crankcase adjacent said front wall, said oil seal ring also including primary and secondary annular lip portions which are axially spaced apart and which project radially inwardly into sliding sealing engagement with the crankshaft, said secondary lip portion being positioned outermost with respect to the crankcase, comprising the improvement wherein said secondary lip portion includes a first part which projects radially inwardly toward the crankshaft and at its radially inner end is disposed in sliding sealed engagement with the crankshaft, said secondary lip portion also being provided adjacent the radially inner end of said first part with an elongated annular flange portion which surrounds the crankshaft and projects axially of the crankshaft in a direction away from the primary lip portion toward the rotatable member, the axially outer end of said flange portion defining the free edge of said secondary lip portion, said secondary lip portion being preformed to define an axially elongated annular groove which surrounds the external periphery of the flange portion, said groove having a closed inner end and having an axially outer end which opens outwardly toward the rotatable member, said groove projecting axially inwardly from the free end of the flange portion and sloping radially inwardly toward the crankshaft so that the closed inner end of the groove is radially disposed more closely adjacent the crankshaft than the open end of the groove, whereby the water which runs downwardly over the upper part of the front face of the crankcase will collect within the groove and then flow therearound for discharge from the lowermost part of the groove.

* * * * *